US008135613B2

(12) United States Patent
Ho et al.

(10) Patent No.: US 8,135,613 B2
(45) Date of Patent: Mar. 13, 2012

(54) RINGBACK ADVERTISING (75) Inventors: Ronald Ho, Fremont, CA (US); Jennifer W. Lin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 650 days.

(21) Appl. No.: 12/014,284

(22) Filed: Jan. 15, 2008

(65) Prior Publication Data

US 2009/0182616 A1    Jul. 16, 2009

(51) Int. Cl.
*G06F 17/30* (2006.01)
(52) U.S. Cl. ........ 705/10; 705/7; 705/14.69; 705/14.13; 705/34; 379/70; 379/207.02
(58) Field of Classification Search .................... 705/10, 705/7, 14.69, 14.13, 34; 379/70
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,985,882 B1 | 1/2006 | Del Sesto | |
| 7,039,599 B2 | 5/2006 | Merriman | |
| 7,136,470 B1 * | 11/2006 | Taylor et al. ............. | 379/114.13 |
| 7,136,875 B2 | 11/2006 | Anderson et al. | |
| 7,756,272 B2 * | 7/2010 | Kocher et al. ................. | 380/202 |
| 7,827,062 B2 * | 11/2010 | Merriman et al. ......... | 705/14.55 |
| 2001/0046279 A1 | 11/2001 | Butterworth | |
| 2005/0144067 A1 * | 6/2005 | Farahat et al. .................... | 705/14 |
| 2007/0027751 A1 * | 2/2007 | Carson et al. ................... | 705/14 |
| 2007/0116227 A1 * | 5/2007 | Vitenson et al. ......... | 379/207.02 |
| 2007/0168462 A1 | 7/2007 | Grossberg | |
| 2007/0297586 A1 | 12/2007 | Butterworth | |
| 2008/0025478 A1 * | 1/2008 | Taylor et al. .................... | 379/70 |
| 2008/0103883 A1 * | 5/2008 | Szybalski et al. ............... | 705/14 |

FOREIGN PATENT DOCUMENTS

| | | |
|---|---|---|
| KR | 10-2000-0036415 | 7/2000 |
| KR | 10-2006-0034023 | 4/2006 |
| KR | 10-0614830 | 8/2006 |
| KR | 10-2007-0097931 | 10/2007 |
| WO | WO 97/21183 | 6/1997 |

OTHER PUBLICATIONS

International Search Report dated Jun. 22, 2009, PCT/US2009/030572, 11 pages.
U.S. Appl. No. 95/001,073, Reexamination of Stone et al., filed Sep. 30, 2004.

(Continued)

*Primary Examiner* — Vanel Frenel
(74) *Attorney, Agent, or Firm* — Fish & Richardson P.C.

(57) ABSTRACT

Methods, systems, and apparatus, including computer program products, in which an indication of a telephone call being placed from a calling number is received, and a determination is made of an audio advertisement to play based on the calling number. The audio advertisement is played based on the determination.

21 Claims, 4 Drawing Sheets

OTHER PUBLICATIONS

U.S. Appl. No. 95/001,061, Reexamination of Stone et al., filed Sep. 3, 2002.

U.S. Appl. No. 95/001,069, Reexamination of Dean et al., filed Jul. 11, 2002.

U.S. Appl. No. 95/001,068, Reexamination of Stone et al., filed Dec. 7, 2002.

AdForce, Inc., A Complete Guide to AdForce, Version 2.6, 1998.

AdForce, Inc., S-1/A SEC Filing, May 6, 1999.

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www. Archive.org, Apr. 12, 1997 and Feb. 1, 1997.

Baseview Products, Inc., AdManagerPro Administration Manual v. 2.0, Dec. 1998.

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

\* cited by examiner

RINGBACK ADVERTISING

BACKGROUND

This document relates to information management.

Advertisers can reach consumers in a variety of ways. Print and online advertising provides opportunities for advertisers to target their advertisements to a receptive audience.

Some advertisers also advertise with phone calls. The advertisers call the consumer and when the consumer answers, the advertisement starts to play. Audio advertisements, however, can unnecessarily bother consumers who do not want to be disturbed by phone calls with advertising information. Providing the audio advertisements at a time that is otherwise filled with a ring tone or other pre-recorded audio, however, can allow the advertiser to advertise while at the same time, not disturb the consumer because the consumer would have to otherwise listen to some other form of audio.

SUMMARY

In general, one aspect of the subject matter described in this specification can be embodied in methods that include the actions of receiving an indication of a telephone call; determining an audio advertisement to play; and playing the audio advertisement prior to a called party answering the telephone call.

Another aspect of the subject matter described in this specification can be embodied in methods that include the actions of receiving one or more audio advertisements, wherein each of the advertisements is associated with a first category; receiving a second category from an entity associated with a called number or calling number; receiving an indication of a telephone call from the calling number; identifying an audio advertisement from the one or more audio advertisements based on the second category; playing the audio advertisement during the telephone call from the calling number to the called number; and receiving a first payment each time the audio advertisement is played.

These various optional advantages and features can be separately realized and need not be present in any particular embodiment. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
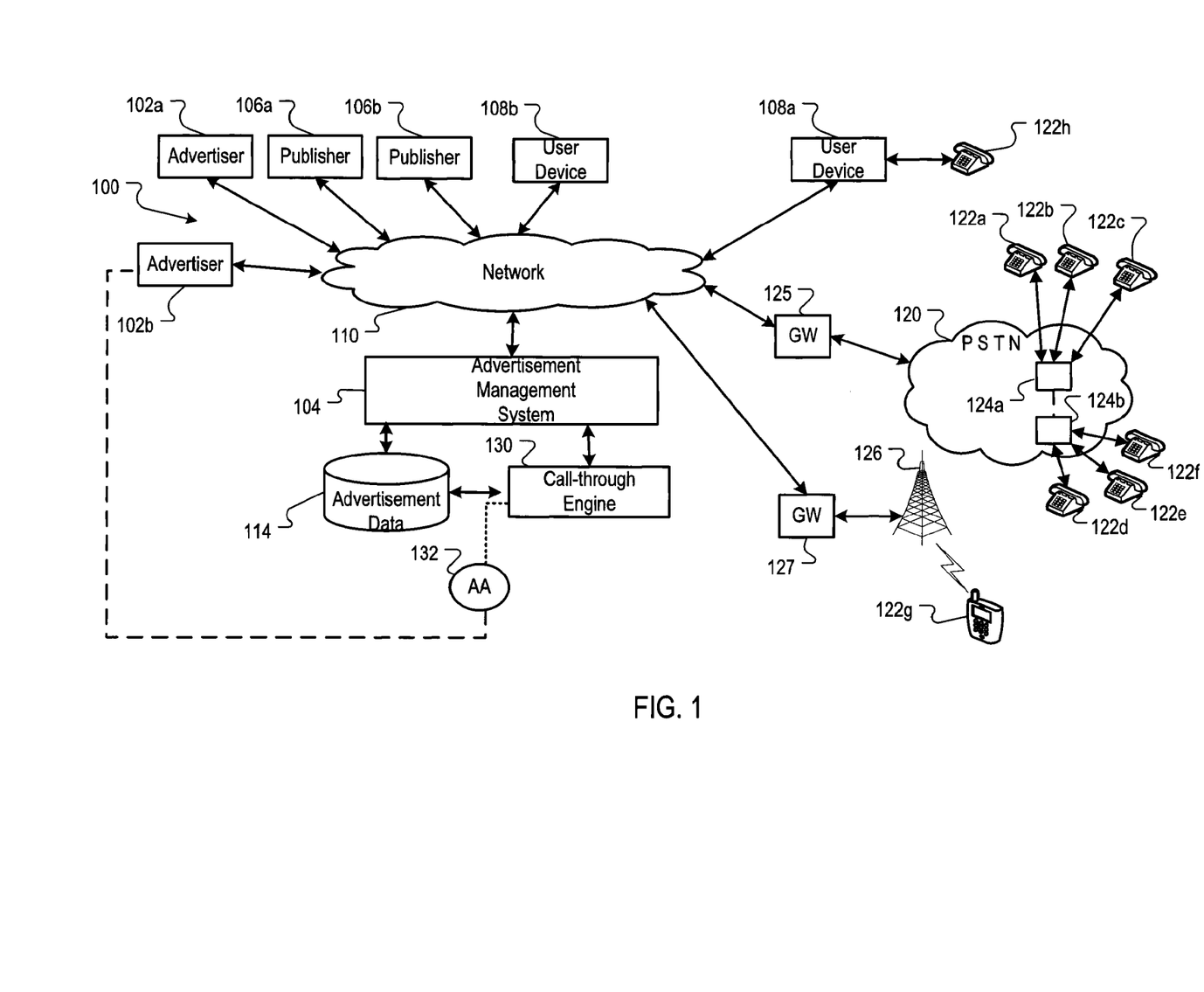
FIG. 1 is a block diagram of an example online environment.

FIG. 1 is a block diagram of an example online environment 100. The online environment 100 can facilitate the identification and serving of content items, e.g., advertisements, etc., to users. A computer network 110, such as a local area network (LAN), wide area network (WAN), the Internet, or a combination thereof, connects advertisers 102a and 102b, an advertisement management system 104, publishers 106a and 106b, and user devices 108a and 108b. Although only two advertisers (102a and 102b), two publishers (106a and 106b) and two user devices (108a and 108b) are shown, the online environment 100 may include many (e.g., thousands) advertisers, publishers and user devices. The network 110 can communicate with other networks, both public and private, such as a public switched telephone network (PSTN) 120 and/or a cellular network 126. As will be described in detail below, the advertisement management system 104 identifies advertisements, e.g., audio advertisements that are played for a caller placing a call to a publisher. While reference is made to delivering advertisements, the environment 100 can deliver other forms of content including other forms of sponsored content.

In some implementations, one or more advertisers 102a and/or 102b can directly, or indirectly, enter, maintain, and track advertisement information in the advertising management system 104. The advertisements can be in the form of audio advertisements, such as advertisements played over a telephone line.

Advertisements can also be provided from the publishers 106. For example, one or more publishers 106a and/or 106b can submit advertisement requests for one or more advertisements to the system 104. The system 104 responds by sending the advertisements to the requesting publisher 106a or 106b for playing over a telephone line when a user places a call to the publisher. The advertisements can include audio advertisements associated with the advertiser. The advertisement requests can also include specifics about the type of advertisements to receive. This information can include a category corresponding to the type of advertisements (e.g., arts, business, computers, arts-movies, arts-music, etc.), and geo-location information (e.g., south, north, Oceanside, etc.).

Publishers 106a and 106b can include any entity, whether an individual or company, that wants to provide advertisements for callers to the publisher. For example, a retail company can be a publisher.

The advertisers 102 and user devices 108 can also provide usage information to the advertisement management system 104. This usage information can include measured or observed user behavior related to advertisements that have been served, such as, for example, how long an audio advertisement was played. The system 104 performs financial transactions, such as crediting the publishers 106 and charging the advertisers 102 based on the usage information. Such usage information can also be processed to measure performance metrics, such as a listen-through rate ("LTR") etc.

A listen-through can occur, for example, when a user of a user device, listens to some or all of an audio advertisement provided by the advertising management system. The LTR is a performance metric that can be obtained by dividing the number of users that listened to the audio advertisement by the number of times the audio advertisement was delivered. For example, if an audio advertisement is delivered 100 times, and three persons listen to the audio advertisement instead of hanging up the phone, then the LTR for that advertisement is 3%. Other usage information and/or performance metrics can also be used. The LTR could also be defined as the number of users (or times) that the audio advertisement was listened to divided by the number of times the audio advertisement was delivered, where an audio advertisement is considered to be listened to if it was played for at least some threshold of time, "X" seconds.

As can be appreciated from the foregoing, the advertising management system 104 permits the serving of advertisements targeted to publishers 106. Additionally, the usage information described above can be used by the advertisement management system 104 to serve higher performing advertisements that are more likely to elicit a response from users of the user devices 108a and 108b.

In some implementations, the serving of the advertisements, such as the advertisement 120, can be further optimized by serving advertisements that are either socially targeted or geographically targeted to users that call the publishers 106. In addition to the advertisements being selected based on social targeting and geographic targeting, the advertisements can also, or in addition, be selected from an auction. In some implementations, the advertisement management system 104 includes an auction process. Advertisers 102 may be permitted to select, or bid, an amount the advertisers are willing to pay for each time their audio advertisement 132 is played as a ring back tone.

For example, advertisers A, B, and C all select, or bid, a cost-per-call of $0.05, $0.07, and $0.10, respectively. The amount advertiser A will pay each time the audio advertisement 132 is played is $0.05, the amount advertiser B will pay is $0.10, and the amount advertiser C will pay is $0.07. The advertisements, associated usage data, and bidding parameters described above can be stored as advertisement data in an advertisement data store 114.

The environment 100 can include a public switched telephone network (PSTN) 120 coupled to the network 110 by a gateway 125. Telephone devices 122a-f can communicate over the PSTN 120. The PSTN 120 includes switching elements 124a-b for identifying information from calls received from telephone devices 122a-f and directing these calls to the called party. The PSTN 120 can be a circuit-switched telephone network, which may be used for analog and/or digital communication links, e.g., time-division multiplexed (TDM) signaling, Integrated Services Digital Network (ISDN) signaling, internet access, dial-up modems to the Internet, etc.

Telephone devices 122a-f comprise any telecommunication device operable to electronically receive and transmit audio, including voice and dual-tone multi-frequency (DTMF) data. Generally, a telephone device operates through transmission of electric signals over the PSTN 120 to allow users to communicate. The environment 100 may include other communication devices such as cellular phones, IP phones, soft phones, personal digital assistants, computing devices with communication capabilities, and/or other communication devices that may communicate over the network 110 either alone or in conjunction with the PSTN 120 and/or other networks. The environment 100 can also be used with voice over IP (VoIP) communications. In some implementations, telephone numbers provided by Internet advertisements direct call initiation requests from the telephone device 122 to the switching element 124 and from the switching element to the calling party.

The switching element 124 comprises any hardware, software, and/or firmware operable to route calls between devices in the PSTN 120 or other network (e.g. part of a VoIP network) and the entity associated with the telephone number dialed. For example, the switching element 124 may receive a request to initiate a call from the telephone device 122 and based, at least in part, on the request, route the call to another element in communication with the PSTN 120, such as the advertisement management system 104.

In addition to the PSTN network 120, other telephone networks and/or protocols can also be used. For example, a cellular telephone 122g can communicate with the network 110 over a cellular network 126 and a gateway 127. Likewise, a voice over Internet Protocol (VoIP) telephone 122h can communicate over the network 110.

In some implementations, the advertisement management system 104 can include a call-through engine 130 that may include instructions, algorithms, or other directives for receiving an indication of a telephone call being placed from a calling number. For example, a user of the user device 108a may call a telephone number displayed associated with a publisher 106 using the telephone 122a. The switching element 124 may receive a request to initiate a call that identifies the telephone number of the publisher 106, and in response to the request, forward information about the call to the advertisement management system 104, and transmit the call to the publisher 106. The call-through engine 130 can identify an advertisement to play, and then may play, or send the audio advertisement to the switching element 124 to play for the calling party, in place of, for example, a ring back tone, prior to the called party answering the call. Usage and billing data for the telephone call can also be collected and updated by the advertisement management system 104 in response to the telephone call. A similar call placement and routing process can also be used if the user of the user device 108 placed the call using the cellular telephone 122g or the VoIP phone 122h.

In some implementations, the call-through engine 130 can receive content items, e.g., audio advertisements 132, from one or more advertisers 102. The content items can include advertisements that are specifically tailored for each advertiser 102. The content items can be associated with different categories and subcategories. For example, an advertiser 102 that sells fruit can provide audio advertisements 132 that are in a category "fruit," with a subcategory of "melons." The category describes the audio advertisements and the subcategory further defines the category. The advertisers 102 can pre-record the audio advertisements 132 and provide them to the system 104.

In some implementations, the call-through engine 130 can receive an indication of a telephone call from a calling number. The call-through engine 130 can, for example, receive an indication of all calls placed to the publishers 106, and prior to the publisher 106 answering the phone, the call-through engine 130 can play an audio advertisement in lieu of the ring back tone to the caller. In other implementations, the call-through engine 130 can receive information associated with the call prior to the call being connected to the publisher 106. The call-through engine 130 can then determine an audio advertisement to play based on the calling number and play the audio advertisement 132 before the call is answered by the called party (e.g., the publisher 106).

In some implementations, the audio advertisement 132 is played in lieu of the ring back tone that callers hear when placing a call to a called party. The audio advertisement 132 replaces the ring back tone. In other implementations, the audio advertisement 132 is played in lieu of a call waiting tone that callers hear when the called party places the caller on hold. Therefore, instead of a tone or silence, the caller hears the audio advertisement 132 when placed on hold.

In some implementations, the publishers 106 can select the types of audio advertisements 132 to be played during a telephone call as a ring back tone or hold tone. The publishers 106 can specify the types of advertisements, categories, as well as sub-categories of the advertisements. When a user places a call to the publisher 106, the call-through engine 130 can provide the audio advertisements 132 based on the category and/or the subcategory selected by the publisher 106.

For example, suppose a publisher 106 only wants callers to hear advertisements associated with instruments. The publisher 106 can specify to only receive audio advertisements 132 that are associated with an "instruments" category. The advertisement management system 130 can then only provide audio advertisements 132 to the publisher 106 that are associated with an "instruments" category.

In some implementations, the publisher 106 can select the length of advertisements to receive. For example, the publisher 106 can specify not to receive any audio advertisements that are longer than 10 seconds.

In some implementations, a location associated with a calling party is identified by the call-through engine 130. The call-through engine 130 can then identify the audio advertisements 132 to play for a calling party based on the location of the calling party. The location can, for example, include a geographic location and include a continent, country, state, city, or zip code associated with the calling party. The call-through engine 130 can then provide any audio advertisements 132 that are associated with the location.

For example, suppose a calling party from Georgia calls a publisher 106. The publisher 106 may have requested the system 104 to only provide audio advertisements 132 that are associated with the location of the calling party. In this example, the system 104 would only provide audio advertisements 132 that are associated with Georgia. Suppose also that an advertiser A is based in Atlanta. The system 104 would then provide any audio advertisements 132 received from advertiser A.

In some implementations, the advertisement management system 104 charges the advertiser 102 regardless of how long the audio advertisement 132 is playing for the calling party. Therefore, even if the calling party hangs up the telephone after hearing only the beginning of the audio advertisement 132, the advertiser 102 is charged the same amount as if the entire audio advertisement 132 was played.

In some implementations, the advertisement management system 104 can determine the length of the audio advertisement 132 that is played and charge the advertiser 102 associated with the audio advertisement 132 an amount proportional to the length. The advertiser 102 can be charged an amount if the entire audio advertisement 132 is played. If the calling party disconnects the call before the audio advertisement 132 finishes playing, the advertiser 102 is only charged for the portion played.

For example, suppose an advertiser A has provided an audio advertisement and will pay $0.30 each time the advertisement is played to a caller. If the call-through engine 130 identifies the advertisement from advertiser A to play for the calling party from Georgia in the example above, Advertiser A is charged the entire $0.30 each time the advertisement is played for a caller. In some implementations, even if the caller hangs up the phone and does not listed to the audio advertisement in its entirety, the advertiser 102 is still charged the entire $0.30 amount. In other implementations, the amount Advertiser A is charged is proportional to the amount of the audio advertisement played for each caller.

In some implementation, the publisher 106 can provide their own audio advertisements 132 to the system 100. The publisher 106 can be charged when audio advertisements (or ring back tones) are listened to. The publisher 106 is not paid for the number of times users listened to audio advertisements (or ring back tones) the publisher 106 has provided.

In some implementations, the advertisement selected can be based on other information such as information associated with the calling party. For example, the calling party's number can be used to determine preferences of the calling party. The calling part can, for example, sign up for a service and then the calling party can specify profile information about what kinds of ads that they want to hear. For example, the calling party can specify a category of advertisements they want to hear, e.g., related to sports or movies.

Figure 2:
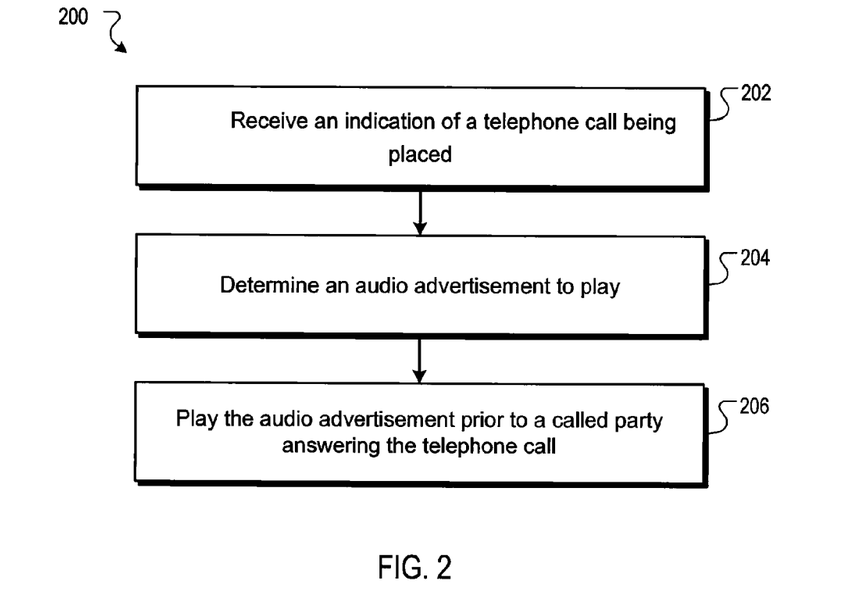
FIG. 2 is a flow diagram of an example process for serving advertisements.

FIG. 2 is a flow diagram of an example process 200 for serving advertisements. The process 200 can, for example, be implemented in the advertisement management system 104 of FIG. 1, or in some other hardware and software computing device.

Stage 202 receives an indication of a telephone call being placed. For example, the call-through engine 130 can receive an indication of a telephone call being placed.

Stage 204 determines an audio advertisement to play. For example, the call-through engine 130 can determine an audio advertisement to play.

Stage 206 plays the audio advertisement prior to a called party answering the telephone call. For example, the call-through engine 130 can play the audio advertisement prior to a called party answering the telephone call.

Figure 3:
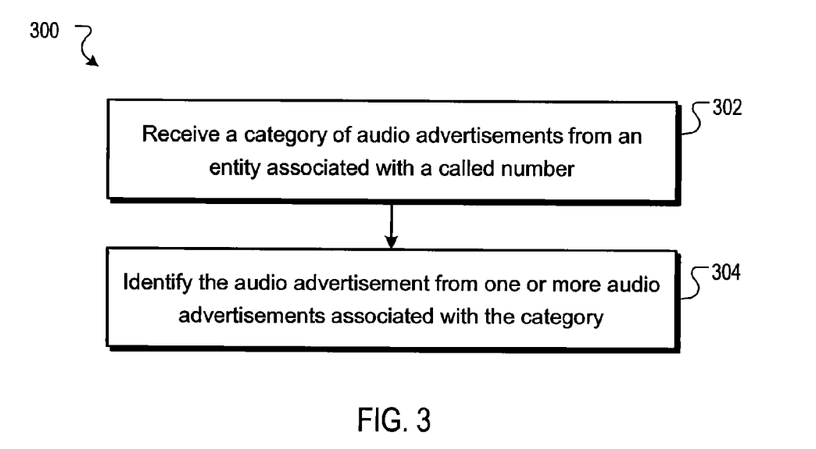
FIG. 3 is a flow diagram of an example process for determining an audio advertisement based on a called number.

FIG. 3 is another flow diagram of an example process 300 for determining an audio advertisement based on a called number. The process 300 can, for example, be implemented in the advertisement management system 104 of FIG. 1, or in some other hardware and software computing device.

Stage 302 receives a category of audio advertisements from an entity associated with a called number. For example, the call-through engine 130 can receive a category of audio advertisements from an entity associated with a called number. Alternatively, the category of audio advertisement can be associated with a caller.

Stage 304 identifies the audio advertisement from one or more audio advertisements associated with the category. For example, the call-through engine 130 can identify the audio advertisement from one or more audio advertisements associated with the category.

Figure 4:
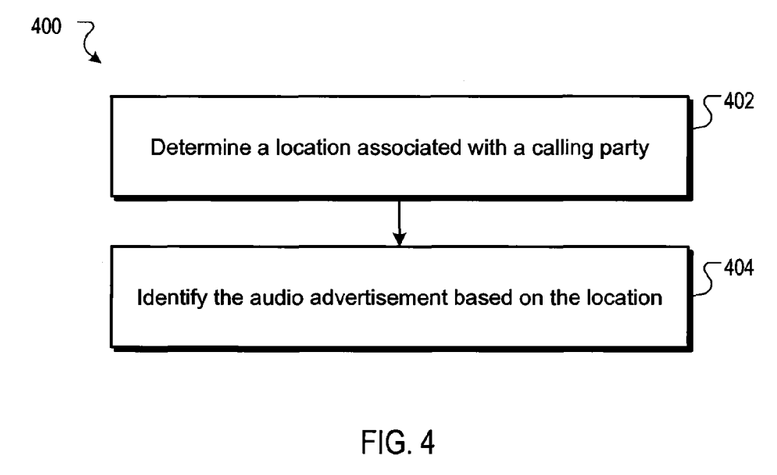
FIG. 4 is another flow diagram of another example process for determining an audio advertisement based on a calling number.

FIG. 4 is another flow diagram of another example process 400 for determining an audio advertisement based on a calling number. The process 400 can, for example, be implemented in the advertisement management system 104 of FIG. 1, or in some other hardware and software computing device.

Stage 402 determines a location associated with a calling party. For example, the call-through engine 130 can determine a location associated with a calling party.

Stage 404 identifies the audio advertisement based on the location. For example, the call-through engine can identify the audio advertisement based on the location.

Figure 5:
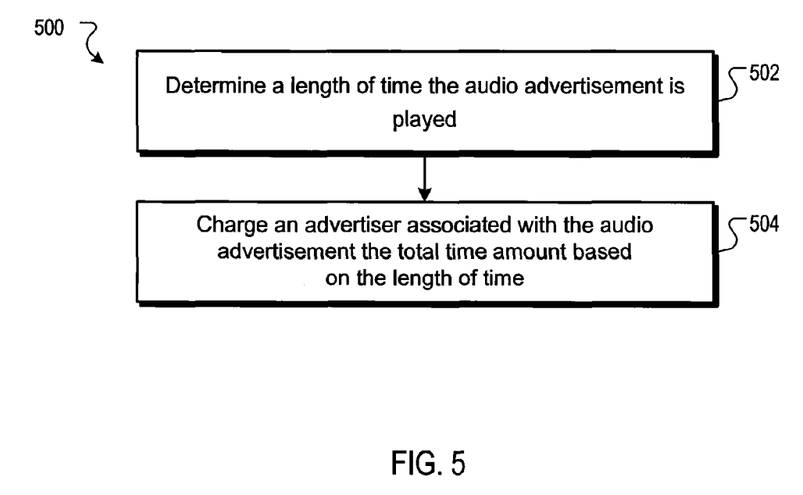
FIG. 5 is a flow diagram of an example process for charging an advertiser based on a length of an audio advertisement played.

FIG. 5 is a flow diagram of an example process 500 for charging an advertiser based on a length of an audio advertisement played. The process 500 can, for example, be implemented in the advertisement management system 104 of FIG. 1, or in some other hardware and software computing device Stage 502 determines a length of time the audio advertisement is played. For example, the call-through engine 130 can determine a length of time the audio advertisement is played.

Stage 504 charges an advertiser associated with the audio advertisement the total time amount based on the length of time. For example, the call-through engine 130 can charge an advertiser associated with the audio advertisement the total time amount based on the length of time.

Figure 6:
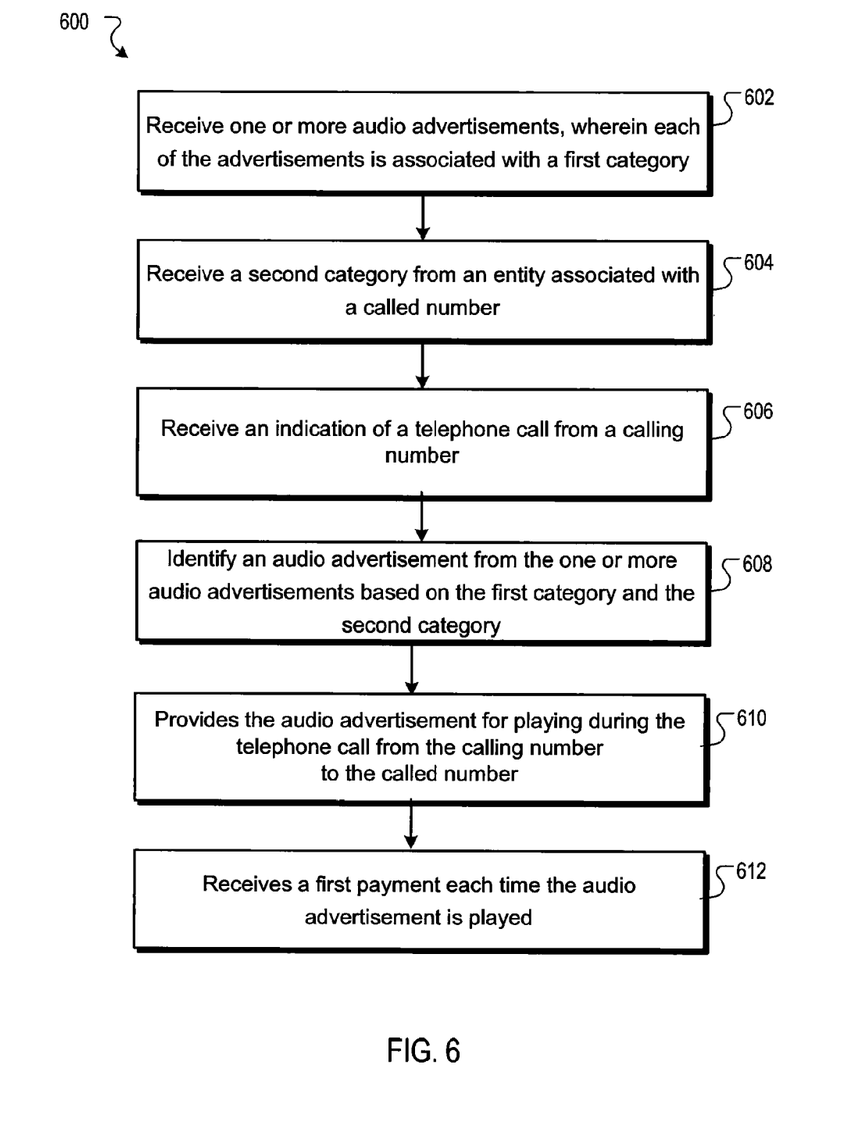
FIG. 6 is a flow diagram of another example process for serving advertisements.

FIG. 6 is a flow diagram of an example process 600 for serving advertisements. The process 600 can, for example, be implemented in the advertisement management system 104 of FIG. 1, or in some other hardware and software computing device Stage 602 receives one or more audio advertisements, wherein each of the advertisements is associated with a first category. For example, the call-through engine 130 can receive one or more audio advertisements, wherein each of the advertisements is associated with a first category.

Stage 604 receives a second category from an entity associated with a called number. For example, the call-through engine 130 can receive a second category from an entity associated with a called number.

Stage 606 receives an indication of a telephone call from a calling number. For example, the call-through engine 130 can receive an indication of a telephone call from a calling number.

Stage 608 identifies an audio advertisement from the one or more audio advertisements based on the first category and the second category. For example, the call-through engine 130 can identify an audio advertisement from the one or more audio advertisements based on the first category and the second category.

Stage 610 provides the audio advertisement for playing during the telephone call from the calling number to the called number. For example, the call-through engine 130 can provide the audio advertisement for playing during the telephone call from the calling number to the called number.

Stage 612 receives a first payment each time the audio advertisement is played. For example, the call-through engine 130 can receive a first payment each time the audio advertisement is played.

The call-through engine 130 can be realized by instructions that upon execution cause one or more processing devices to carry out the processes and functions described above. Such instructions can, for example, comprise interpreted instructions, such as script instructions, e.g., JavaScript or ECMA-Script instructions, or executable code, or other instructions stored in a computer readable medium.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   receiving an indication of a telephone call being placed from a calling number;
   determining, using one or more processors, an audio advertisement to play;
   playing at least a portion of the audio advertisement prior to a called party answering the telephone call; updating, using one or more processors, a listen-through rate of the advertisement, wherein the listen-through rate is a measure of a number of times the audio advertisement was played for at least a threshold time period divided by a measure of a number of times the audio advertisement was delivered; and
   providing listen-through rate data to an advertiser associated with the audio advertisement.

2. The method of claim 1, wherein the threshold time period is measured from a beginning of the advertisement to a time when the called party answers.

3. The method of claim 1, wherein determining an audio advertisement to play comprises: receiving a category of audio advertisements from an entity associated with the called party; and identifying the audio advertisement from one or more audio advertisements associated with the category.

4. The method of claim 1, wherein determining an audio advertisement to play comprises:
   determining a location associated with a calling party; and
   identifying the audio advertisement based on the location.

5. The method of claim 1, wherein playing the audio advertisement prior to a called party answering the telephone call comprises:
   playing the audio advertisement as at least one of a ringback tone, call waiting tone, or hold tone.

6. The method of claim 1, further comprising:
   determining a length of time the audio advertisement is played; and
   charging an advertiser associated with the audio advertisement an amount based on the length of time.

7. A method, comprising:
   receiving a first category from an entity associated with a called number;
   receiving one or more audio advertisements, wherein each of the advertisements is associated with a respective category; receiving a second category associated with a calling number; receiving an indication of a telephone call from the calling number to the called party; identifying, using one or more processors, an audio advertisement associated with a category that matches the first category and the second category; and
   providing the identified audio advertisement for playing during the telephone call from the calling number.

8. The method of claim 7, further comprising:
   charging an advertiser associated with the identified audio advertisement.

9. The method of claim 8, further comprising:
   determining a length of time the audio advertisement is played; and
   charging an advertiser associated with the audio advertisement an amount based on the length of time.

10. The method of claim 7, further comprising:
    paying the publisher an amount based on a number of times the audio advertisement was played.

11. The method of claim 7, wherein providing the audio advertisement for playing during the telephone call from the calling number to the called number comprises: providing the advertisement for playing as at least one of a ringback tone, a call waiting tone, or a hold tone.

12. A system, comprising:
    a data store configured to store audio advertisements; and
    a call-through engine comprising instructions stored in a computer readable medium that, when executed by data processing apparatus, cause the data processing apparatus to perform operations comprising: receiving an indication of a telephone call;
    determining an audio advertisement to play; playing at least a portion of the audio advertisement prior to a called party answering the telephone call; updating a listen-through rate of the advertisement, wherein the listen-through rate is a measure of a number of times the audio advertisement was played for at least a threshold time period divided by a measure of a number of times the audio advertisement was delivered; and providing listen-through rate data to an advertiser associated with the audio advertisement.

13. The system of claim 12, wherein the threshold time period is measured from a beginning of the advertisement to a time when the called party.

14. The system of claim 12, wherein the operations further comprise: receiving a category of audio advertisements from an entity associated with the called party or a calling party; and identifying the audio advertisement from one or more audio advertisements associated with the category.

15. The system of claim 12, wherein the operations further comprise: determining a location associated with a calling party; and identifying the audio advertisement based on the location.

16. The system of claim 12, wherein the operations further comprise: playing the audio advertisement as at least one of a ringback tone, a call waiting tone, or a hold tone.

17. The system of claim 12, wherein the operations further comprise: determining a length of time the audio advertisement is played; and
charging an advertiser associated with the audio advertisement an amount based on the length of time.

18. A system, comprising: a data store configured to store audio advertisements; and a call-through engine comprising instructions stored in a computer readable medium that, when executed by data processing apparatus, cause the data processing apparatus to perform operations comprising: receiving a first category from an entity associated with a called number; receiving one or more audio advertisements, wherein each of the advertisements is associated with a respective category; receiving a second category associated with a calling number; receiving an indication of a telephone call from the calling number to the called party; identifying an audio advertisement associated with a category that matches the first category and the second category; and providing the identified audio advertisement for playing during the telephone call from the calling number.

19. The system of claim 18, wherein the operations further comprise: charging an advertiser associated with the identified audio advertisement.

20. The system of claim 19, wherein the operations further comprise: determining a length of time the audio advertisement is played; and charging an advertiser associated with the audio advertisement an amount based on the length of time.

21. The system of claim 18, wherein the operations further comprise: paying the publisher an amount based on a number of times the audio advertisement was played.

* * * * *